C. C. WILSON.
Car Coupling.
No. 39,087.
Patented June 30, 1863.
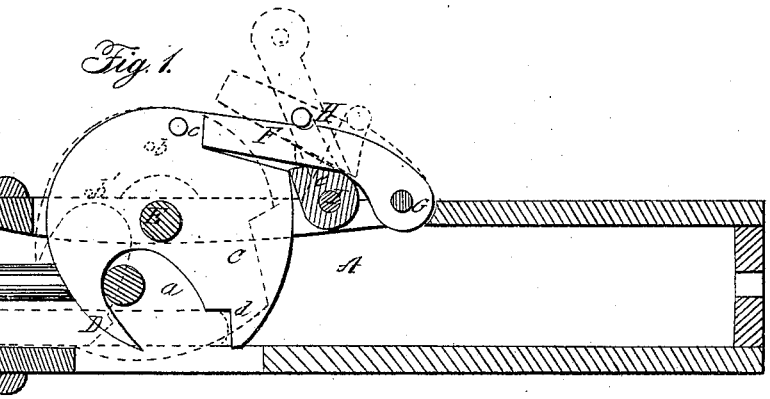
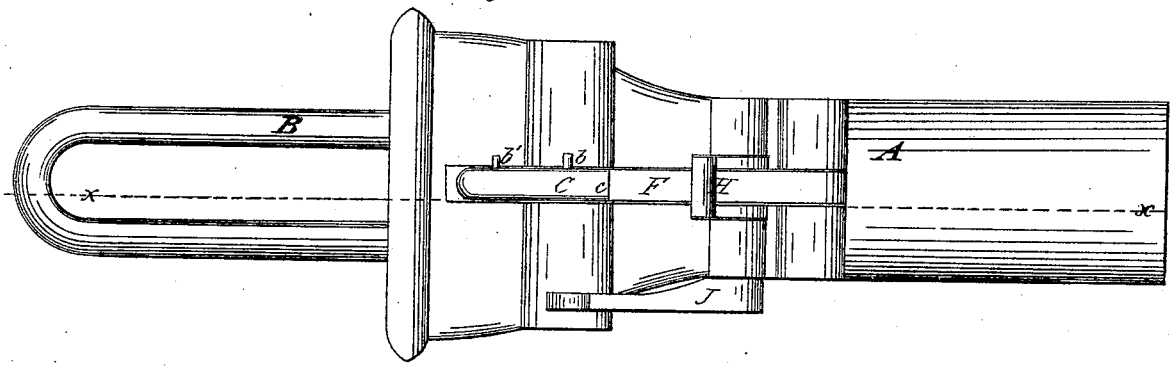
Witnesses:
Inventor:

UNITED STATES PATENT OFFICE.

C. C. WILSON, OF KEWANEE, ILLINOIS.

IMPROVEMENT IN CAR-COUPLINGS.

Specification forming part of Letters Patent No. 39,087, dated June 30, 1863.

*To all whom it may concern:*

Be it known that I, C. C. WILSON, of Kewanee, in the county of Henry and State of Illinois, have invented a new and Improved Car-Coupling; and I do hereby declare that the following is a full, clear, and exact description of the same, reference being had to the accompanying drawings, making part of this specification, in which—

Figure 1 is a side sectional view of my invention, taken in the line $x\ x$, Fig. 2; Fig. 2, a plan or top view of the same.

Similar letters of reference indicate corresponding parts in the two figures.

This invention consists in the employment or use of a circular hook-plate placed eccentrically on a shaft in the draw-head and arranged with a stop in such a manner that the hook will serve as a fastening for the link, so that the latter, when thus fitted in two adjoining draw-heads will form a connection between the cars thereof. The hook-plate is so arranged that it will, when not in use, remain in a position to admit of the link when it enters the draw-head to connect itself, and the hook-plate is so formed that it will hold or retain the link in a horizontal position when fitted in one draw-head only, so that the outer or disengaged end of the link may enter the draw-head of an adjoining car.

The object of the invention is to obtain a car-coupling of simple construction, which will be self-coupling, not liable to get out of repair, and which may be readily uncoupled or have its link disconnected from either draw-head with the greatest facility.

To enable those skilled in the art to fully understand and construct my invention, I will proceed to describe it.

A represents a draw-head, which may be constructed similar to those now in use, it being provided with a flaring mouth in order to admit of the ready entrance of the link B.

C represents a circular plate, which has a recess, $a$, made in it of such shape as to form a hook, D, as shown clearly in Fig. 1. This plate C is fitted eccentrically and loosely on a shaft, E, placed in the upper part of the draw-head. The shaft E is stationary, and the eccentric position of the loose plates C upon it causes the latter, when in a free condition, always to adjust itself by gravity, so that the hook D will be in the position shown in red outline in Fig. 1. The extent of the turning movement of the plate C is limited by the pins $b\ b'$, the pin $b$ limiting the extent of the upward movement of the hook D, and the pin $b'$ limiting the extent of its downward movement. This will be fully understood by referring to Fig. 1, in which the pins are shown in red and black dots to designate their two different positions. When the plate C is in the position as shown in black in Fig. 1, the hook D is engaged with the coupling-link B, and the plate is retained in this position by a stop, F, which is simply a curved bar fitted on a shaft, G, on the draw-head, and having its outer end bearing against a shoulder, $c$, on the plate. The bar or stop F passes through a loop, H, which is attached to a shaft, I, on the draw-head, and this shaft I has a lever or arm, J, at one end of it.

From the above description it will be seen that in order to uncouple the cars all that is required is simply to turn the shaft I through the medium of the lever or arm J, and the loop H will raise the stop or bar F free from the shoulder $c$ of the plate C, so that the hook D will rise either under the pull of the link or by the gravity of plate C. It is designed to have the loop H so formed and arranged on the shaft I that when it is raised to throw up the stop or bar F that it will retain the latter in an elevated state. This is necessary, for if the stop or bar be not held up, the plate C, in case of being turned forward after the link is disconnected, would be locked in such position, so as to hold the hook D downward, and consequently prevent the link from coupling itself with the hook. The back part of the recess $a$ has a jog, $d$, made in it to receive the inner end of the link, when its outer end is free or disengaged, and hold said link in a horizontal position, so that it may enter the draw-head of an adjoining car. (See red outline in Fig. 1.) The lower part of the loop H is of cam form, as shown at $e$ in Fig. 1, and this cam raises the stop or bar when the shaft I is turned in the proper direction for the purpose.

Having thus described my invention, what I claim as new, and desire to secure by Letters Patent, is—

1. The plate C, of circular or approximate form, and provided with a shoulder, c, in combination with the stop or bar F and loop H, or its equivalent, all arranged relatively with each other, and in connection with the draw-head A, to operate as and for the purpose specified.

2. The jog d in the back part of the recess a, for the purpose of holding the link in a horizontal position, as specified.

C. C. WILSON.

Witnesses:
WM. H. GREEN,
E. P. JOHNSON.